Jan. 30, 1945. W. T. ANDERSON 2,368,092
SAW BAND FOR HARD REFRACTORY MATERIALS
Filed Dec. 30, 1943 2 Sheets-Sheet 1
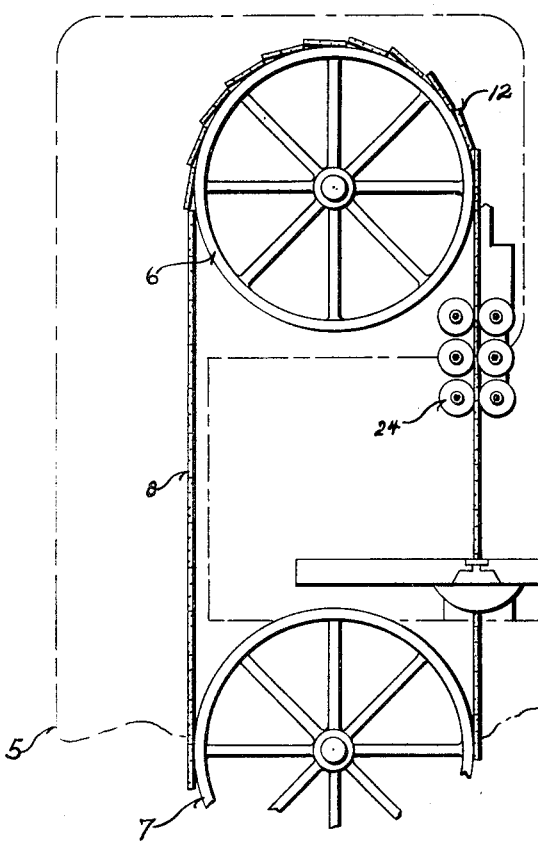
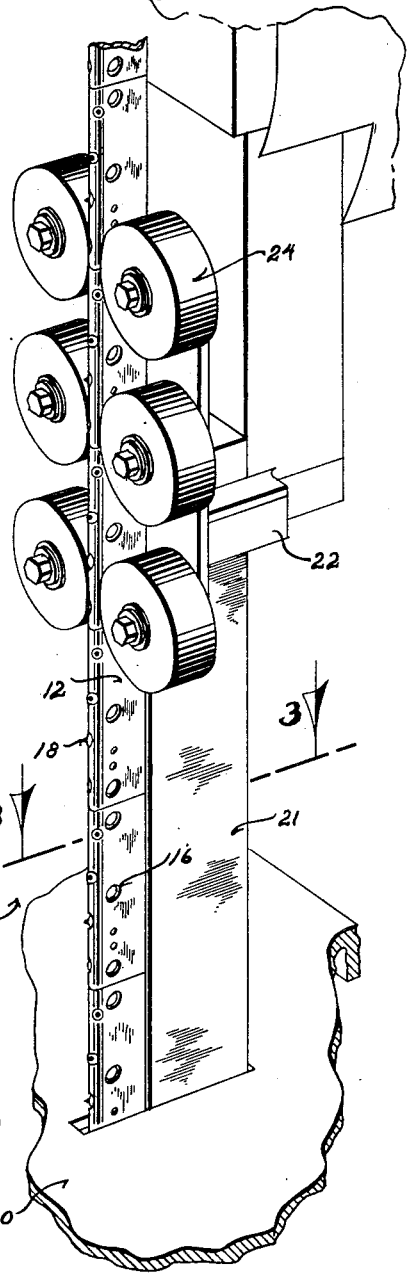
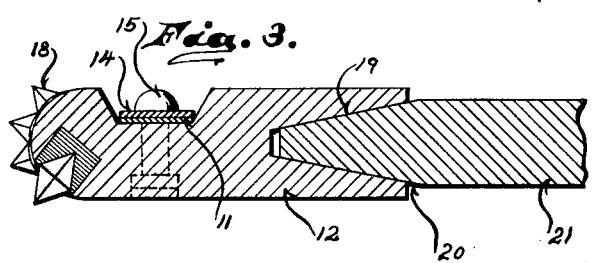
Inventor
William T. Anderson

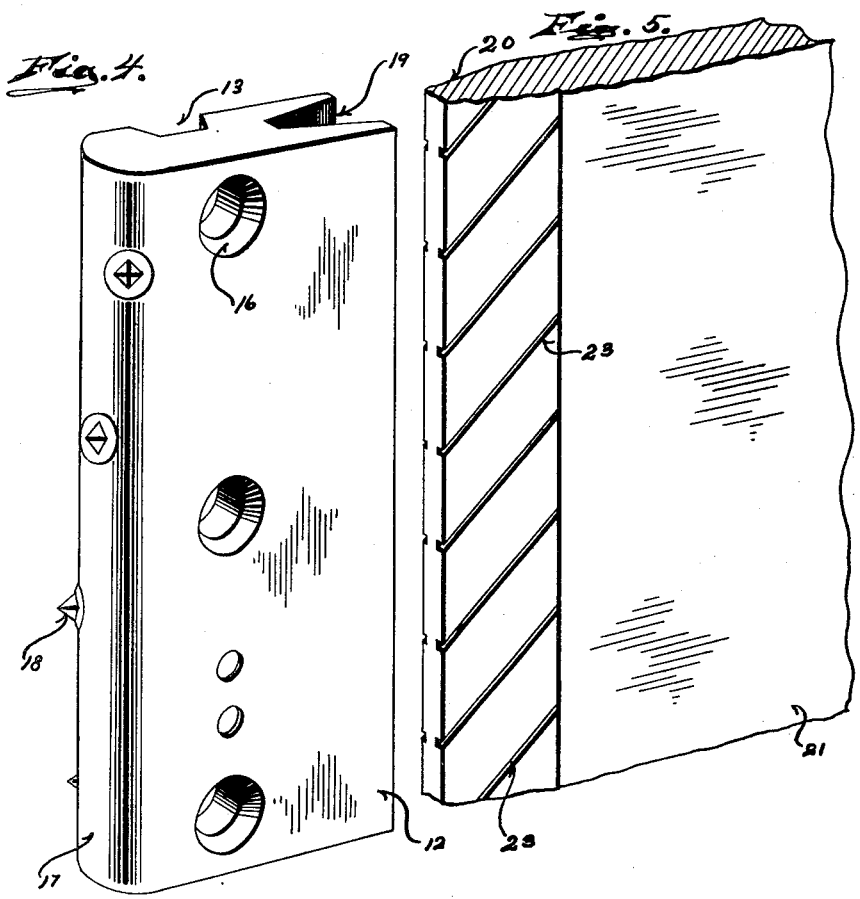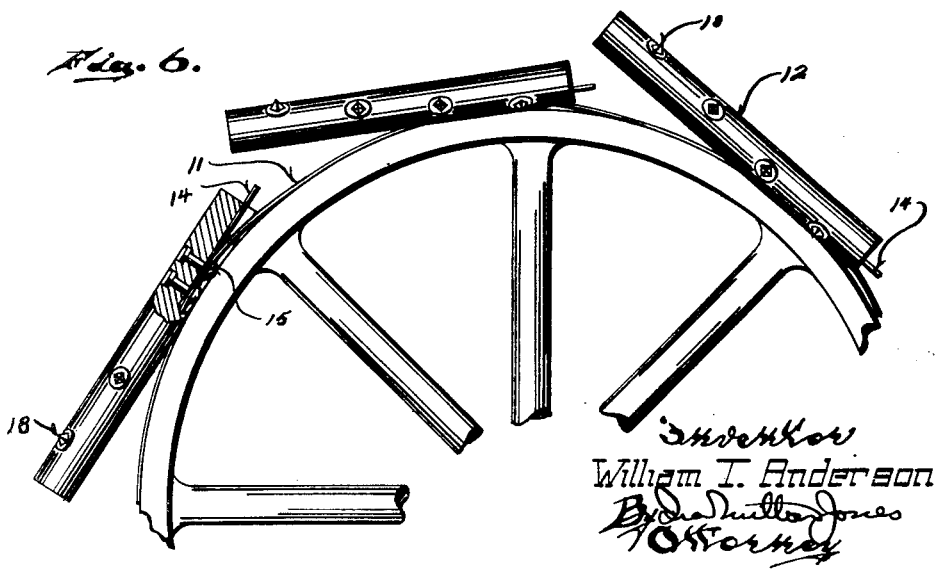

Patented Jan. 30, 1945

2,368,092

UNITED STATES PATENT OFFICE 2,368,092

SAW BAND FOR HARD REFRACTORY MATERIALS

William T. Anderson, Des Plaines, Ill., assignor to Contour Saws, Incorporated, Des Plaines, Ill., a corporation of Illinois Application December 30, 1943, Serial No. 516,291

18 Claims. (Cl. 125—21)

This invention relates to saws, and refers particularly to band saws designed for cutting extremely hard refractory materials.

Broadly, it is an object of this invention to provide a band saw in which the cutting edge is formed by a series of diamonds.

In addition to the advantage of contour sawing, the application of cutting diamonds to a band saw as distinguished from a circular saw materially decreases the cost of the saw, as the number of diamonds necessary in a band saw of any given maximum capacity is a great deal less than the number of diamonds required in a circular saw of equal maximum capacity.

Thus, with a view toward providing a practical and commercial band saw with a diamond cutting edge, this invention has as another of its objects the provision of a saw band composed essentially of a flexible carrier band having bar-like segments mounted flatwise thereon with one edge of each segment mounting a plurality of diamonds so arranged as to cut a kerf wide enough to accommodate the band.

Another object of this invention is to provide a saw of the character described wherein the guide and backup to support segments as they pass through the working zone is so designed that no portion thereof is wider than the band and wherein wear resulting from the passage of the segments across the guide does not effect the rigidity with which the guide supports the segments.

In this respect it is a further object of this invention to provide a guide and backup of metal softer than that of the segments so that any wear which does take place occurs on the guide and backup and not the segments.

Another object of this invention resides in the provision of a novel interengagement between the backup and the saw band segments wherein rigidity against lateral displacement of the segments is assured through the employment of a tapered edge on the backup received in a correspondingly shaped longitudinal groove in the back edge of each segment.

Still another object of this invention is to provide means for guiding the saw band segments in their approach to the guide and backup to thereby firmly support the same in proper alignment with the guide and backup and thus insure smooth engagement of the segments with the guide and backup.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a view diagrammatically illustrating a band saw of the type with which this application is concerned and specifically showing the application of the saw band of the invention thereto;

Figure 2 is a perspective view illustrating the guide and backup and a length of the saw band riding thereon and passing through the working zone of the machine;

Figure 3 is an enlarged cross sectional view through the saw band and the guide and backup, said view being taken on the plane of the line 3—3 of Figure 2;

Figure 4 is an enlarged perspective view of one of the saw band segments;

Figure 5 is a perspective view of a portion of the guide and backup; and

Figure 6 is a plan view of a portion of the saw band illustrating particularly the manner in which the segments are mounted thereon to permit flexing of the band.

Referring now particularly to the accompanying drawings, in which like numerals indicate like parts, the numeral 5 designates the frame of a metal cutting band saw of the type more particularly illustrated in Patent No. 2,180,078, issued to Leighton A. Wilkie, November 14, 1939. As is customary in band saws of this type, superimposed upper and lower pulleys 6 and 7 are mounted in the frame to carry the saw band indicated generally by the numeral 8.

One of the pulleys, preferably the lower pulley is driven so that one stretch of the saw band moves downwardly in a straight line through a working zone 9 which is the space defined by the throat of the band saw frame above its work supporting table 10.

The saw band of this invention consists of a flexible steel band 11, the ends of which are adapted to be joined to form an endless unit after application to the pulleys 6 and 7. Mounted on the flexible steel band are bar-like segments 12 of steel or other suitable metal. Each segment has a longitudinal groove 13 in one face thereof of a depth sufficient to receive the cross section of the band 11, a spacer 14 and the heads 15 of the rivets by which the segment is secured to the flexible band.

The attachment of each segment to the band is confined to the substantially localized area of the segment to allow the band to flex over the pulleys, and the spacer 14, which projects from the fastened end of the segment, terminates slightly beyond the farthest rivet so that the bottom of the groove 13 for the major portion of its length is spaced from the adjacent face of the band 11 during the straight stretches of the band. This spacing facilitates the expulsion of the sludge and other products of the cutting action through holes 16 in the segment in line with its groove 13.

One edge 17 of each segment is rounded and has a plurality of cutting diamonds 18 mounted therein to constitute the cutting edge of the band. The diamonds are preferably octahedron in shape and are so mounted that the diamonds of each segment overlap around the curvature of the segment edge as shown in Figure 3. Hence, the kerf cut by the diamonds is wider than the segments.

Obviously, of course, the segments are so mounted on the band that their rounded edges 17 in which the diamonds are mounted are in line and form a continuous cutting edge as the band travels through the working zone due to the end to end disposition of the segments. The opposite or rear edge of each segment has a rather deep V-shaped longitudinal groove 19 therein. This groove fits the correspondingly tapered forward edge 20 of a rigid guide and back up 21 mounted in the working zone of the machine.

The groove 19 is deep enough so that the tapered edge 20 of the guide does not bottom, but instead its tapered sides snugly engage the sides of the groove 19 to firmly hold the segment in its passage through the working zone regardless of wear which might take place.

The guide and backup 21 preferably extends down beneath the top surface of the work supporting table 10 to be supported at its lower end in any suitable manner. Its upper end is carried by the overhanging arm 22 of the machine frame.

Preferably, the guide and backup is formed of brass or some other suitable metal softer than that of which the segments are made so that any wear which takes place will be on the guide and backup and not on the segments; and to insure adequate lubrication for the engaging surfaces of the segments and backup, the tapered sides 20 of the guide and backup are provided with oil grooves 23, it being understood that adequate provision is made to supply the tapered edge 20 of the guide and backup with lubricant.

In view of the fact that the segments fit the guide and backup closely, it is essential that they be properly aligned therewith before they engage the same and to this end guide rollers 24 are provided. A series of these rollers engages each of the opposite faces of the segments as they approach the guide and backup and as will be seen from Figure 2 the spacing of these rollers is such that each segment is gripped between two sets of rollers before engaging the guide and backup. Thus positive assurance is had that the segments will be properly aligned with the guide and backup at the instant they engage the same.

From the foregoing description taken in connection with the accompanying drawings it will be readily apparent to those skilled in the art that this invention provides a saw capable of handling such extremely hard and refractory materials as carbon and that it not only permits the cutting of such materials but also enables contour sawing thereof.

What I claim as my invention is:

1. A saw band comprising: a flexible carrier adapted to be trained about spaced pulleys; a plurality of solid metal segments secured flatwise to the carrier in end to end relationship; and diamonds mounted in one edge of said segments and so arranged on said edge as to conjointly cut a kerf wide enough to accommodate the saw band.

2. A saw band of the character described, comprising: a flexible band-like carrier; a plurality of bar-like segments having a longitudinal groove in one face thereof of a size and width to receive the carrier band; means securing each segment to the band at a substantially localized area of the segment to enable flexing of the assembled saw band, said segments meeting end to end on straight stretches of the band; and diamonds set into one edge of each segment and offset with respect to each other to conjointly form a cutting edge adapted to cut a kerf wide enough to accommodate the saw band.

3. A saw band of the character described, comprising: a flexible steel carrier band; a plurality of bar-like segments mounted flatwise on the band, each segment having a longitudinal groove in one face thereof to receive the carrier band; fastening means securing each segment to the carrier band at a substantially localized area of the segment so as to enable flexing of the band about supporting pulleys while enabling end to end disposition of the segments on straight stretches of the band; one edge of each segment being rounded; diamonds set into said rounded edge of each segment and arranged spirally about the edge so that the diamonds conjointly form a cutting edge capable of cutting a kerf wide enough to accommodate the band; and the opposite edge of each segment having a deep longitudinal groove therein to slidably receive a rigid backup by which the segments are supported during the cutting operation.

4. A saw band of the character described, comprising: a flexible steel carrier band; a plurality of bar-like segments mounted flatwise on the band, each segment having a longitudinal groove in one face thereof to receive the carrier band; fastening means passing through the bottom of said groove in the segment securing each segment to the carrier band at a substantially localized area of the segment so as to enable flexing of the band about supporting pulleys while enabling end to end disposition of the segments on straight stretches of the band; one edge of each segment being rounded; diamonds set into said rounded edge of each segment and arranged spirally about the edge so that said diamonds conjointly form a cutting edge capable of cutting a kerf wide enough to accommodate the band; and each segment having at least one hole entirely therethrough and opening to the bottom of the longitudinal groove through which the products of the cutting action may be expelled from said longitudinal groove.

5. A saw band of the character described, comprising: a flexible steel carrier band; a plurality of bar-like segments mounted flatwise on the band, each segment having a longitudinal groove in one face thereof to receive the carrier band; fastening means passing through the bottom of said groove in the segment securing each segment to the carrier band at a substantially localized area of the segment so as to enable flexing of the band about supporting pulleys while enabling end to end disposition of the segments on straight stretches of the band; one edge of each segment being rounded; diamonds set into said rounded edge of each segment and arranged spirally about the edge so that said diamonds conjointly form a cutting edge capable of cutting a kerf wide enough to accommodate the band; and each segment having a deep V-shaped longitudinal groove in its opposite edge to slidably receive a correspondingly shaped rigid backup by which the segments are firmly held for straight line movement through a working zone.

6. In a saw of the character described: a flexible carrier band; a plurality of bar-like segments fastened flatwise to the band with the fastening thereof confined to a localized area of the segment so as to enable flexing of the band about supporting pulleys; cutting diamonds embedded in one edge of each segment adapted to cut a kerf wide enough to accommodate the assembled carrier band and segments; and a rigid backup extending through the working zone of the saw to support the segments as they move therethrough, said backup having a tapered edge slidably received in a correspondingly shaped groove in the back edge of each segment, and the thickness of said backup being no greater than that of the segments.

7. In a saw of the character described: a flexible steel band mounted to have a straight line passage through the working zone of the saw; barlike segments secured flatwise to said band with the securement of each segment at a substantially localized area thereof so as to enable flexing of the band; cutting diamonds mounted in one edge of each segment and arranged to cut a kerf wide enough to accommodate the segments, the back edge of each segment having a substantially V-shaped longitudinal groove therein; and a rigid backup having a tapered edge slidably received in the grooves of the segments as they pass through the working zone to thereby rigidly support each segment for straight line passage through the working zone.

8. In a saw of the character described: a flexible steel band mounted to have a straight line passage through the working zone of the saw; bar-like segments secured flatwise to said band with the securement of each segment at a substantially localized area thereof so as to enable flexing of the band; cutting diamonds mounted in one edge of each segment and arranged to cut a kerf wide enough to accommodate the segments, the back edge of each segment having a substantially V-shaped longitudinal groove therein; and a rigid backup having a tapered edge slidably received in the grooves of the segments as they pass through the working zone to thereby rigidly support each segment for straight line passage through the working zone, the backup being of metal softer than that of which the segments are made to minimize wear on the segments.

9. In a saw of the character described: a flexible carrier band; a plurality of bar-like segments each having a longitudinal groove in one face thereof to receive the carrier band; means fastening each segment to the band with the band disposed in its longitudinal groove and with the fastening confined to a substantially localized area of the segment to accommodate flexing of the band; cutting diamonds fixed in one edge of each segment and arranged to cut a kerf wide enough to accommodate the segments; a rigid backup to support the segments during the cutting action; said backup and segments having a sliding interengaging relationship whereby the backup holds the segments firmly against lateral displacement; and a plurality of guide rollers engaging the opposite faces of the segments as they approach the backup to guide the same into proper engagement with the backup.

10. In a saw of the character described: a flexible carrier band; a plurality of bar-like segments each having a longitudinal groove in one face thereof to receive the carrier band; means fastening each segment to the band with the band disposed in its longitudinal groove and with the fastening confined to a substantially localized area of the segment to accommodate flexing of the band; cutting diamonds fixed in one edge of each segment and arranged to cut a kerf wide enough to accommodate the segments; a rigid backup to support the segments during the cutting action; said backup and segments having a sliding interengaging relationship whereby the backup holds the segments firmly against lateral displacement; and a plurality of guide rollers engaging the opposite faces of the segments as they approach the backup to guide the same into proper engagement with the backup, said rollers being so spaced that each segment is engaged by two rollers, spaced along the path of movement of the segments, before it engages the backup.

11. In a tool of the character described: a flexible band-like carrier; a plurality of bar-like segments having a longitudinal groove in one face thereof of a size and width to receive the carrier band; means securing each segment flatwise to the band with the band disposed in its longitudinal groove and with the point of securement at a substantially localized area of the segment to enable flexing of the assembled band and with at least one side edge of the segment disposed in edgewise spaced relation to the carrier band, said segments meeting end to end on straight stretches of the band with the said side edges thereof in alignment; and cutting elements on said side edge of each segment adapted to cut a kerf wide enough to accommodate the assembled carrier band and segments.

12. A work cutting band of the character described, comprising: a flexible ribbon-like carrier band; a plurality of bar-like segments mounted flatwise on the band, each segment having a longitudinal groove in one face thereof to receive the carrier band; fastening means securing each segment to the carrier band at a substantially localized area of the segment so as to enable flexing of the band about supporting pulleys while enabling end to end disposition of the segments on straight stretches of the band; cutting elements mounted on one edge of each segment adapted to cut a kerf wide enough to accommodate the assembled carrier band and segments; and the opposite edge of each segment having a deep longitudinal groove therein to slidably receive a rigid backup by which the segments are supported and held in axial alignment during the cutting operation.

13. In a tool of the character described: a flexible carrier band; a plurality of bar-like segments fastened flatwise to the band with the fastenings thereof confined to localized areas of the segments so as to enable flexing of the band about supporting pulleys; cutting elements on one edge of each segment adapted to cut a kerf wide enough to accommodate the assembled carrier band and segments; and a rigid backup extending through the working zone of the tool to support the segments as they move therethrough, said backup having a tapered edge slidably received in a correspondingly shaped groove in the back edge of each segment and the thickness of said backup being no greater than that of the segments.

14. In a tool of the character described: a flexible carrier band; a plurality of bar-like segments each having a longitudinal groove in one face thereof to receive the carrier band; means fastening each segment to the band with the band disposed in its longitudinal groove and with the fastening confined to a substantially localized area of the segment to accommodate flexing of the band; cutting elements on one edge of each segment adapted to cut a kerf wide enough to accommodate the segments; a rigid backup for supporting the segments during the cutting action; and said backup and segments having a sliding interengaging relationship whereby the backup holds the segments firmly against lateral displacement.

15. In a tool of the character described: a flexible carrier band; a plurality of bar-like segments each having a longitudinal groove in one face thereof to receive the carrier band; means fastening each segment to the band with the band disposed in its longitudinal groove and with the fastening confined to a substantially localized area of the segment to accommodate flexing of the band; cutting elements on one edge of each segment adapted to cut a kerf wide enough to accommodate the segments; a rigid backup for supporting the segments during the cutting action; said backup and segments having a sliding interengaging relationship whereby the backup holds the segments firmly against lateral displacement; and a plurality of guide rollers engaging the opposite faces of the segments as they approach the backup to guide the same into proper engagement with the backup.

16. In a tool of the character described: a flexible band-like carrier; a plurality of bar-like segments having a longitudinal groove in one face thereof of a depth and width to receive the carrier band; means securing each segment flatwise to the band with the band disposed in its longitudinal groove and with the point of securement at a substantially localized area of the segment to enable flexing of the assembled band and with at least one side edge of the segment disposed in edgewise spaced relation to the carrier band, said segments meeting end to end on straight stretches of the band with the said side edges thereof in alignment; and said edge of the segments having cutting means exposed thereon to cut a kerf wide enough to receive the assembled carrier band and segments.

17. In a tool of the character described: a flexible band-like carrier; a plurality of bar-like segments having a longitudinal groove in one face thereof of a depth and width to receive the carrier band; means securing each segment flatwise to the band with the band disposed in its longitudinal groove and with the point of securement at a substantially localized area of the segment to enable flexing of the assembled band and with at least one side edge of the segment disposed in edgewise spaced relation to the carrier band, said segments meeting end to end on straight stretches of the band with the said side edges thereof in alignment; and cutting means embedded in said segments and exposed on said side edge thereof to cut a kerf wide enough to receive the assembled carrier band and segments.

18. A work cutting band comprising: a flexible carrier ribbon; a plurality of bar-like segments; means securing each segment flatwise to the carrier ribbon with the point of securement at a substantially localized area of the segment so as to enable flexing of the assembled band about supporting pulleys while enabling end to end disposition of the segments on straight stretches, one of the side edges of each segment having exposed cutting means thereon constituting a cutting edge for cutting a kerf wide enough to receive the assembled band, and the opposite side edge of each segment being formed to have sliding inter-engagement with a rigid back-up by which the segments are supported and rigidly held with their cutting edges in alignment.

WILLIAM T. ANDERSON.